United States Patent
Hernandez Sanchez et al.

(10) Patent No.: US 12,128,806 B2
(45) Date of Patent: Oct. 29, 2024

(54) SUPPORT DEVICE FOR A MOVEABLE LOAD BEARING VEHICLE COMPONENT

(71) Applicant: GM GLOBAL TECHNOLOGY OPERATIONS LLC, Detroit, MI (US)

(72) Inventors: Omar Rene Hernandez Sanchez, Estado de Mexico (MX); Hector Alejandro Castro Nunez, Toluca (MX); Juan Carlos Valencia Flores, Chalco (MX); Jairo Abraham Cruz Lopez, Estado de Mexico (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 367 days.

(21) Appl. No.: 17/684,926

(22) Filed: Mar. 2, 2022

(65) Prior Publication Data
US 2023/0278478 A1   Sep. 7, 2023

(51) Int. Cl.
| | |
|---|---|
| *B60R 5/04* | (2006.01) |
| *B60N 3/00* | (2006.01) |
| *B60R 11/00* | (2006.01) |
| *B60R 13/01* | (2006.01) |

(52) U.S. Cl.
CPC ............ *B60N 3/00* (2013.01); *B60R 5/04* (2013.01); *B60R 13/011* (2013.01); *B60R 2011/0036* (2013.01)

(58) Field of Classification Search
CPC ... B60R 5/04; B60R 5/045; B60R 2011/0036; B60R 2011/0082; B60R 13/011; B60R 13/013; B60R 13/0268

USPC ............... 296/37.14, 37.16, 24.44
See application file for complete search history.

(56) References Cited

U.S. PATENT DOCUMENTS

| | | | |
|---|---|---|---|
| 10,046,708 B1 * | 8/2018 | Peralta Orta | ......... B60R 13/013 |
| 2004/0160076 A1 * | 8/2004 | Masuda | .................... B66F 7/08 |
| | | | 296/37.3 |
| 2013/0257081 A1 * | 10/2013 | Whalen | ................... B60R 5/045 |
| | | | 296/37.5 |
| 2015/0054299 A1 * | 2/2015 | Yoshizawa | .............. B60R 5/045 |
| | | | 296/37.16 |
| 2018/0056880 A1 * | 3/2018 | Gage | ....................... B60R 5/045 |
| 2018/0162292 A1 * | 6/2018 | Wertich | ................ B62D 43/06 |
| 2020/0062159 A1 * | 2/2020 | Schnur | ..................... B60R 7/04 |

(Continued)

FOREIGN PATENT DOCUMENTS

DE   102022108704 A1 * 10/2023
EP        1849650 A1 * 10/2007   ........... B60N 2/3009

*Primary Examiner* — Gregory A Blankenship
(74) *Attorney, Agent, or Firm* — CANTOR COLBURN LLP

(57) ABSTRACT

A device for supporting a moveable load bearing component includes a base configured to be fixedly disposed at a vehicle support structure and located proximate to the load bearing component, the load bearing component configured to be moved between a first position and a second position. The device also includes a support member connected to the base and moveable between a retracted position and a load position, the support member supporting the load bearing component when the support member is in the load position. The support member is configured to automatically move between the retracted position and the load position based on the load bearing component being moved between the first position and the second position.

20 Claims, 11 Drawing Sheets

(56) References Cited

U.S. PATENT DOCUMENTS

| | | | |
|---|---|---|---|
| 2023/0063725 A1* | 3/2023 | Cho | B60P 1/02 |
| 2023/0278478 A1* | 9/2023 | Hernandez Sanchez | B60N 3/00 296/1.07 |

* cited by examiner

SUPPORT DEVICE FOR A MOVEABLE LOAD BEARING VEHICLE COMPONENT

INTRODUCTION

The subject disclosure relates to vehicle load bearing components, and more particularly, to support devices for moveable load bearing components.

Many vehicles, including passenger vehicles such as sedans, sport utility vehicles, truck and others, include cargo compartments or areas for storage. Some feature moveable components such as moveable load floors that allow a user to customize the cargo space to accommodate different items and increase convenience. A challenge in designing such load floors is ensuring that load floors can sufficiently support the weight of cargo, while being able to be unobtrusively stowed in the vehicle when not in use.

SUMMARY

In one exemplary embodiment, a device for supporting a moveable load bearing component includes a base configured to be fixedly disposed at a vehicle support structure and located proximate to the load bearing component, the load bearing component configured to be moved between a first position and a second position. The device also include a support member connected to the base and moveable between a retracted position and a load position, the support member supporting the load bearing component when the support member is in the load position. The support member is configured to automatically move between the retracted position and the load position based on the load bearing component being moved between the first position and the second position.

In addition to one or more of the features described herein, the support member is configured to be moved from the load position to the retracted position by a force applied by the load bearing component when the load bearing component is moved from the second position to the first position, and the support member is configured to be held in the retracted position by the load bearing component when the load bearing component is in the first position.

In addition to one or more of the features described herein, the device further includes a biasing component configured to bias the support member toward the load position.

In addition to one or more of the features described herein, the support member is configured to rotate between the load position and the retracted position about a pivot member of the base.

In addition to one or more of the features described herein, the load bearing component is a load floor in a vehicle compartment.

In addition to one or more of the features described herein, the first position is a default position and the second position is a raised position relative to the first position, and the load floor is configured to be moved by longitudinally sliding the load floor.

In addition to one or more of the features described herein, the support member is configured to be moved from the load position to the retracted position by the load floor when the load floor is moved from the raised position to the default position, and held in the retracted position by a weight of the load floor when the load floor is in the default position.

In addition to one or more of the features described herein, the support member is configured to rotate from the retracted position to the load position by a biasing component when the load floor is moved from the default position to the raised position.

In one exemplary embodiment, a method of supporting a moveable load bearing component includes moving the load bearing component in a vehicle compartment between a first position and a second position, the vehicle compartment including a support device having a base fixedly disposed at the vehicle compartment and located proximate to the load bearing component, the support device including a support member connected to the base and moveable between a retracted position and a load position. The method also includes automatically moving the support member between the retracted position and the load position based on the load bearing component being moved between the first position and the second position, the support member supporting the load bearing component when in the load position.

In addition to one or more of the features described herein, the support member is moved from the load position to the retracted position by a force applied by the load bearing component when the load bearing component is moved from the second position to the first position, and the support member is held in the retracted position by the load bearing component when the load bearing component is in the first position.

In addition to one or more of the features described herein, the support device includes a biasing component configured to bias the support member toward the load position.

In addition to one or more of the features described herein, moving the support member includes rotating the support member about a pivot member of the base.

In addition to one or more of the features described herein, the load bearing component is a load floor in a vehicle compartment.

In addition to one or more of the features described herein, the first position is a default position and the second position is a raised position relative to the first position, and moving the load floor includes longitudinally sliding the load floor.

In addition to one or more of the features described herein, the support member is moved from the load position to the retracted position by the load floor when the load floor is moved from the raised position to the default position, and held in the retracted position by a weight of the load floor when the load floor is in the default position.

In addition to one or more of the features described herein, the support member is rotated from the retracted position to the load position by a biasing component when the load floor is moved from the default position to the raised position.

In one exemplary embodiment, a vehicle system includes a load bearing component disposed in a compartment of the vehicle, the load bearing component configured to be moved from a first position to a second position. The vehicle system also includes a support device including a base and a support member connected to the base, the base configured to be fixedly disposed in the compartment and located proximate to the load bearing component. The support member is moveable between a retracted position and a load position, and the support member is configured to support the load bearing component when the support member is in the load position. The support member is configured to automatically move between the retracted position and the load position based on the load bearing component being moved between the first position and the second position.

In addition to one or more of the features described herein, the support member is configured to be moved from the load position to the retracted position by a force applied by the load bearing component when the load bearing component is moved from the second position to the first position, and the support member is configured to be held in the retracted position by the load bearing component when the load bearing component is in the first position.

In addition to one or more of the features described herein, the support device includes a biasing component configured to bias the support member toward the load position.

In addition to one or more of the features described herein, the load bearing component is a load floor in a vehicle compartment, the first position is a default position and the second position is a raised position relative to the first position, the load floor configured to be moved by longitudinally sliding the load floor. The support member is configured to be moved from the load position to the retracted position by the load floor when the load floor is moved from the raised position to the default position, and held in the retracted position by a weight of the load floor when the load floor is in the default position, and the support member is configured to rotate from the retracted position to the load position by a biasing component when the load floor is moved from the default position to the raised position.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

and

Figure 11:
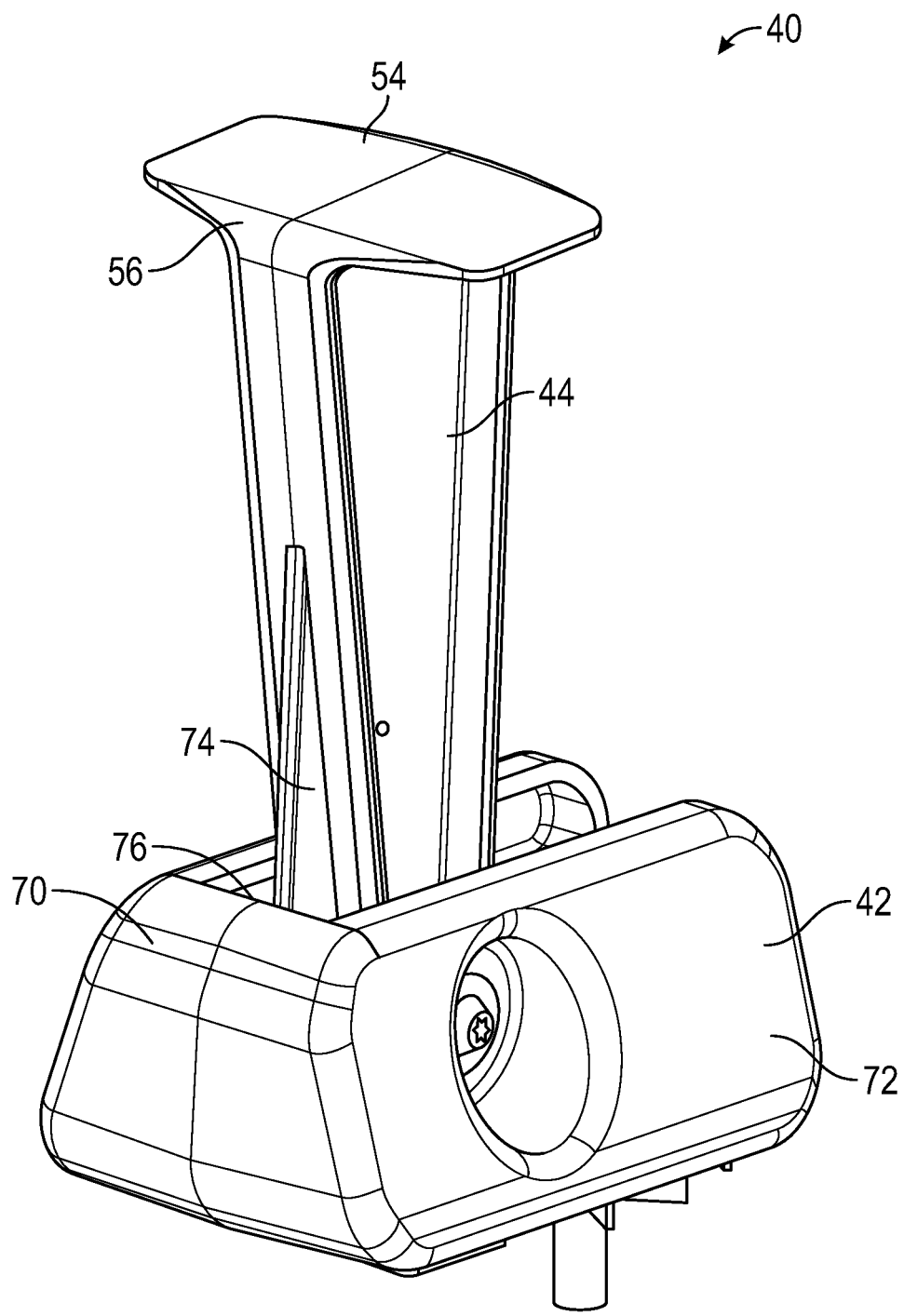
FIG. 11 is a perspective view of a support device, in accordance with an exemplary embodiment.
Figure 12A:
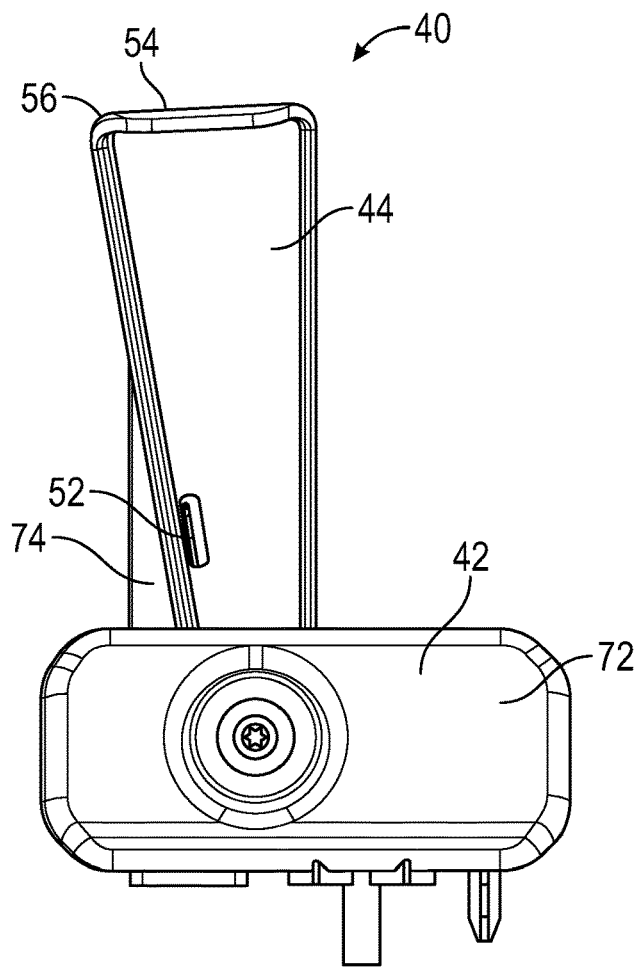
FIGS. 12A and 12B are side views of the support device of FIG. 11.
Figure 12B:
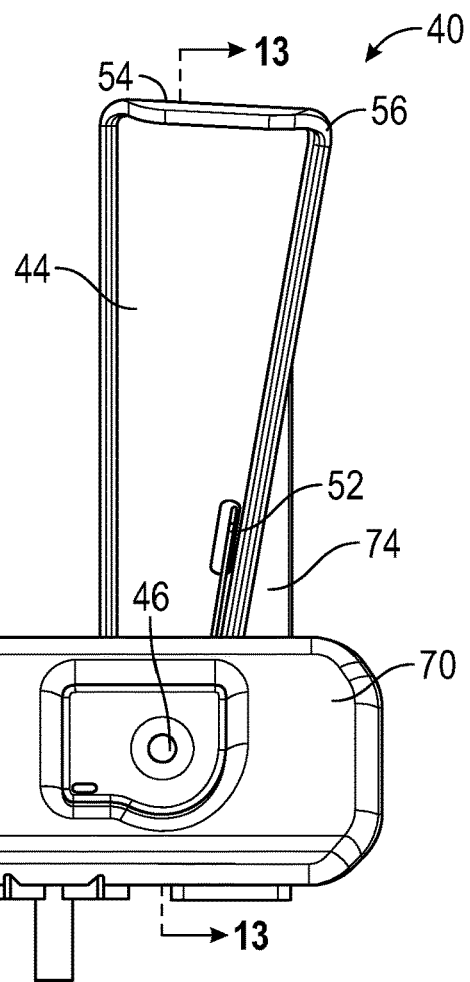
Figure 13:
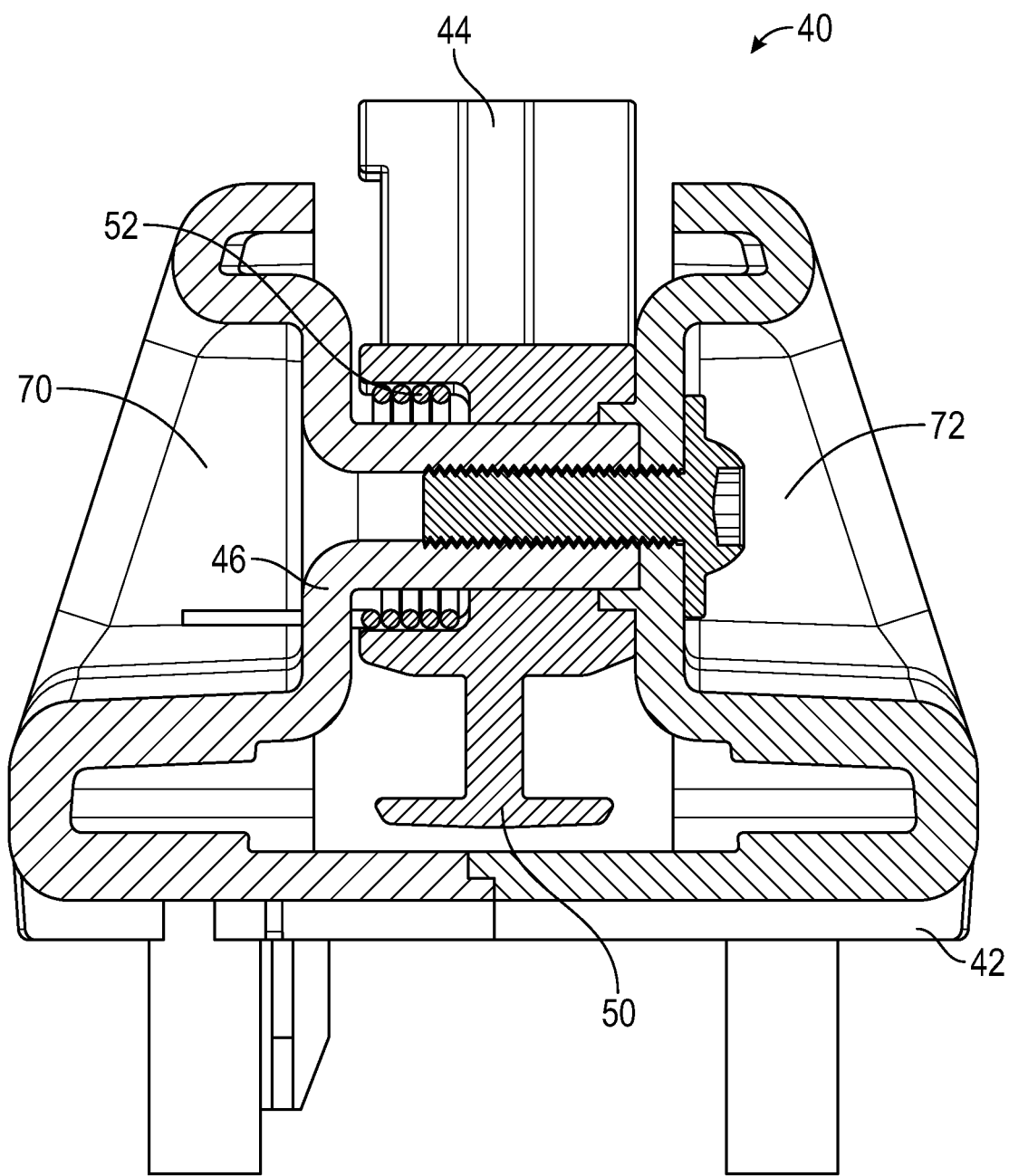

FIG. 13 is a cross-sectional view of a portion of the support device of FIG. 11, taken along line '13-13' shown in FIG. 12B.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for supporting a moveable or convertible load bearing component of a vehicle. In an embodiment, the load bearing component is a convertible load floor (e.g., in a trunk or rear cargo area) that can be manually or automatically moved between two or more positions.

An embodiment of a support device is configured to be attached to a support structure in a vehicle, such as a base or fixed floor of a cargo compartment, and automatically provide support to the load bearing component when the load bearing component is moved from a first position (e.g., a default position) to a second position (e.g., a raised or load bearing position). The support device includes a support member that is moveable between a retracted position and a load position, in response to movement of the load bearing component. In an embodiment, the support member is biased toward the load position. In the load position, the support member engages the load bearing component and provides support to the load bearing component. The support member also aids in distributing load forces when in the load position.

Embodiments described herein present numerous advantages and technical effects. The embodiments provide a simple and effective mechanism for reinforcing or supporting a convertible load floor or other load bearing component. The support device described herein is simple to use, provides automatic support without requiring additional actuators or steps, is compact, and can be installed and used without interfering with the operation of the load bearing component.

The embodiments describe herein are not limited to use with any specific vehicle, device or system, and may be applicable to various devices and systems. For example, embodiments may be used with automobiles, trucks, aircraft, construction equipment, farm equipment, automated factory equipment and/or any other device or system that includes convertible load bearing components.

Figure 1:
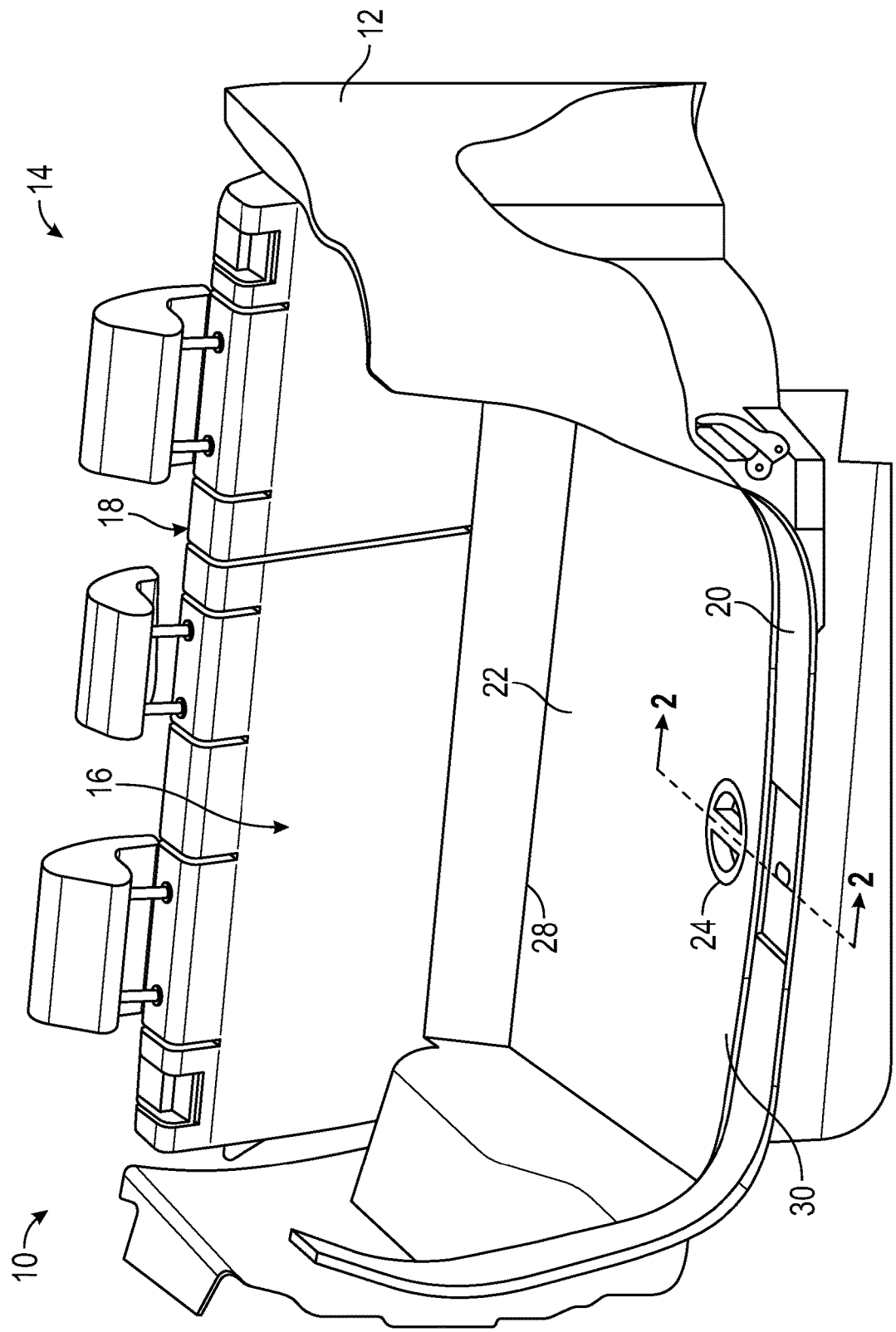
FIG. 1 is a perspective view of a portion of a motor vehicle including a cargo compartment having a convertible and moveable load floor, in accordance with an exemplary embodiment.

FIG. 1 shows a portion of an embodiment of a motor vehicle 10, which may be a combustion engine vehicle, an electrically powered vehicle (EV) or a hybrid vehicle. The vehicle 10 includes a vehicle body 12 defining, at least in part, an occupant compartment 14, and a rear cargo compartment 16 defined by the vehicle body 12 and a vehicle seat 18. The cargo compartment is accessible via a rear door opening 20. The cargo compartment 16 includes a moveable or convertible load floor 22 that can be moved between two or more positions. For example, the load floor 22 can be moved from a first or default position, as shown in FIG. 1, to one or more other positions (not shown). The load floor 22 can be moved manually by a user (e.g., via a handle 24) or via a control system and actuator.

Figure 2A:
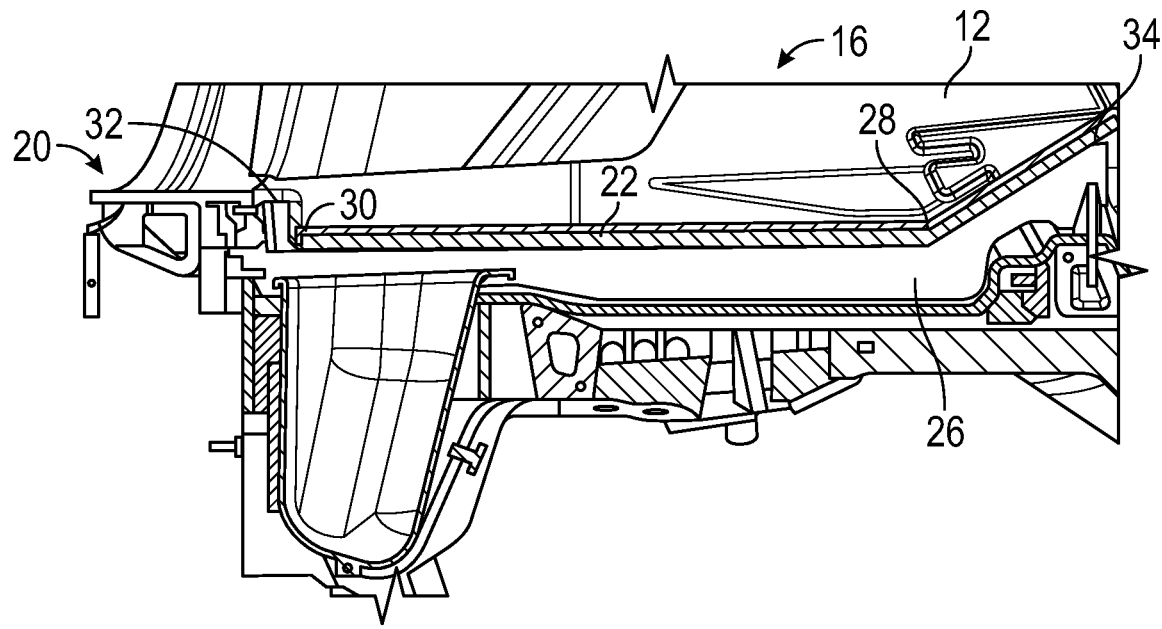
FIGS. 2A and 2B depict the moveable load floor in a first position and a second position.
Figure 2B:
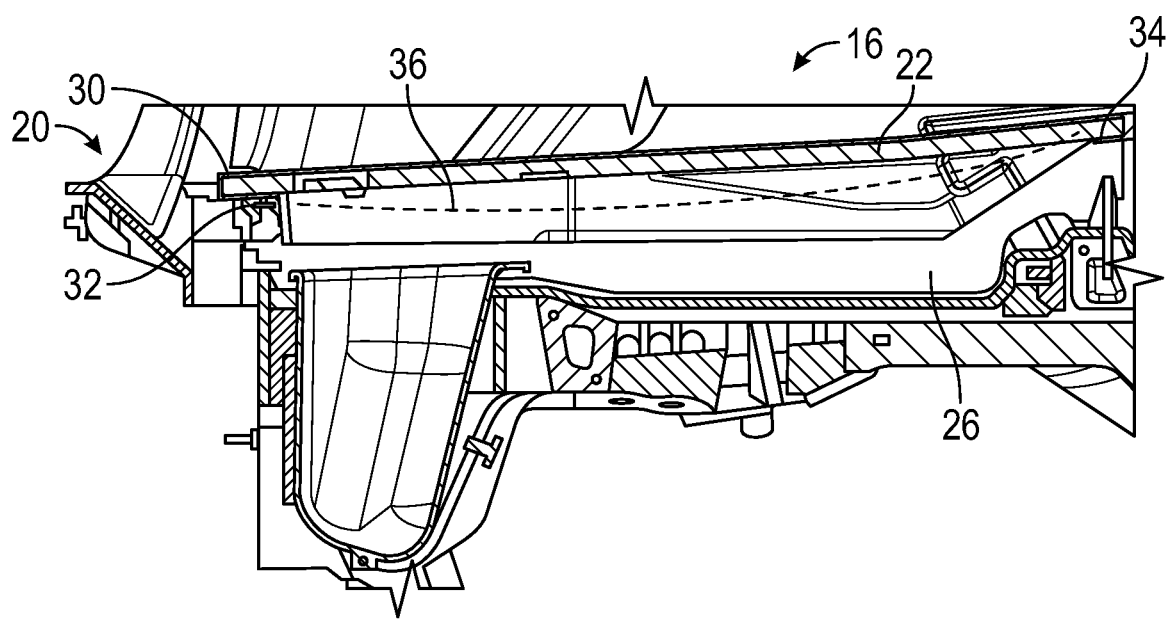

FIGS. 2A and 2B show a cross-section of the cargo compartment 16 and illustrate examples of load floor positions. The cross-section is taken along a plane represented by line '2-2' shown in FIG. 1. FIG. 2A shows the load floor 22 in a first position or default position, which in this example is a lower position in which the load floor 22 rests on a fixed structure or base 26 (e.g., a fixed load floor). FIG. 2B shows the load floor 22 in a second position or raised position.

The load floor 22, in this example, is made from two flat panels connected by a sliding hinge connector 28. To move the load floor 22, a user engages the load floor 22 (e.g., via the handle 24) and raises and pulls an end 30 of the load floor 22 longitudinally (e.g., towards the rear of the vehicle 10), so that the load floor 22 forms a flat surface that is supported by end supports 32 and 34.

If a sufficient load is put onto the load floor 22 in the raised position, the load floor 22 can potentially deform or displace. For example, as shown in FIG. 2B, the load floor 22 can potentially bend due to weight and curve downward, as shown by line 36.

Figure 3:
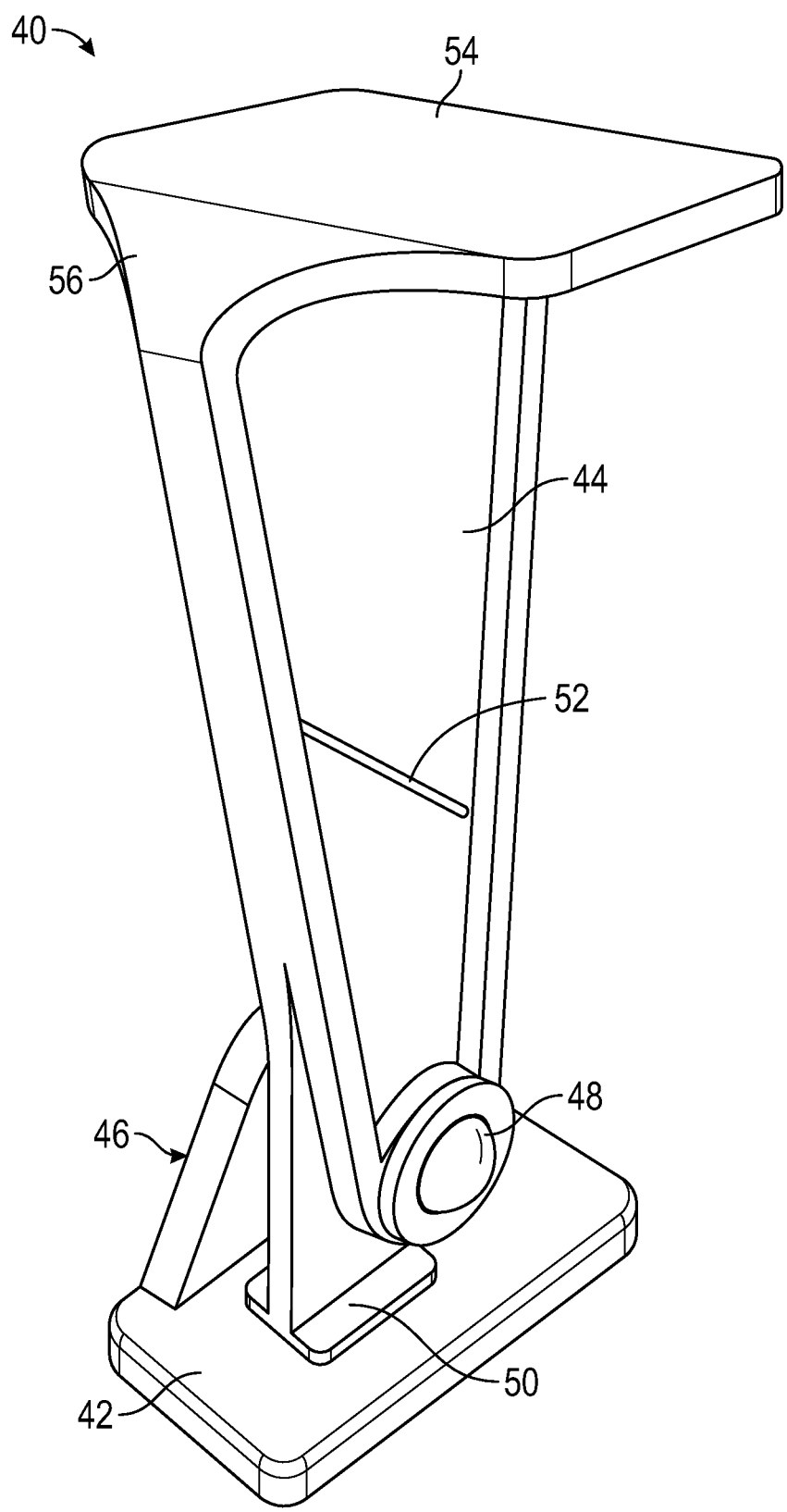
FIG. 3 is a perspective view of a support device, in accordance with an exemplary embodiment.
Figure 4A:
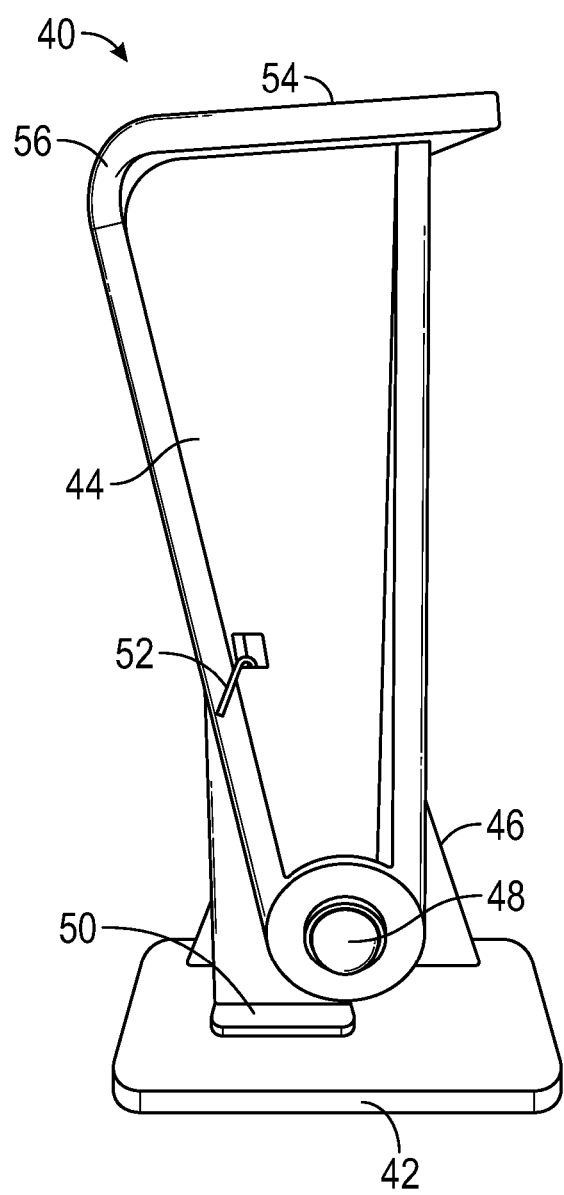
FIGS. 4A and 4B are side views of the support device of FIG. 3.
Figure 4B:
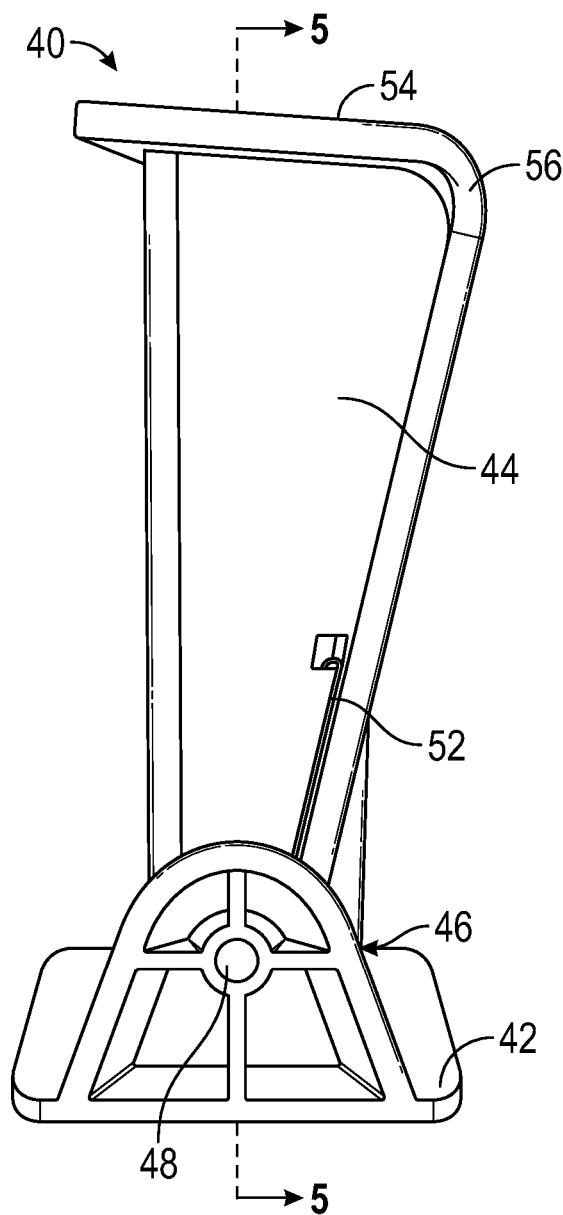
Figure 5:
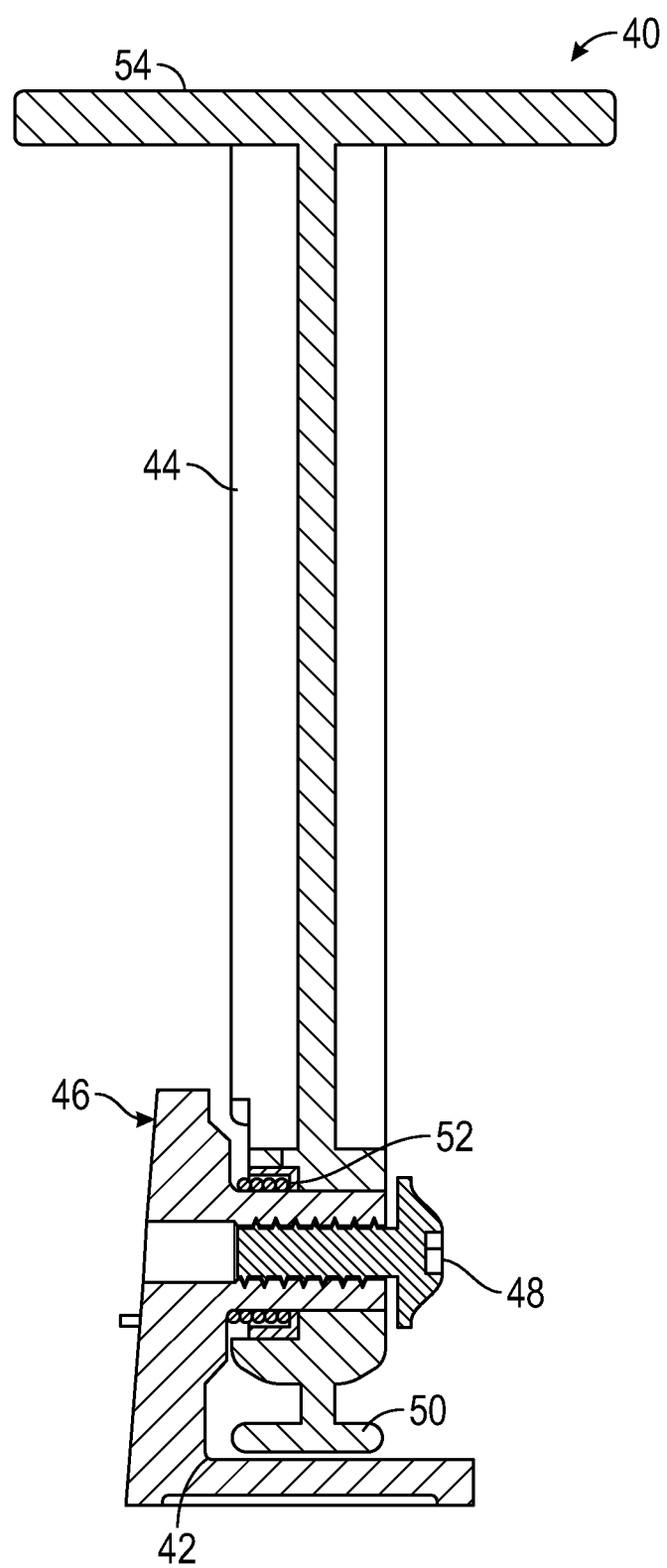
FIG. 5 is a cross-sectional view of the support device of FIG. 3, taken along line '5-5' shown in FIG. 4B.

FIGS. 3, 4A, 4B and 5 depict an embodiment of a load floor support device 40 configured to be installed in the vehicle 10 (e.g., a vehicle cargo compartment). The support device 40 provides support to the load floor 22 when the load floor 22 is in the raised position, and prevents some or all deformation of the load floor 22. FIG. 3 is a perspective view of the support device 40, and FIGS. 4A and 4B are opposing side views. FIG. 5 is a cross-sectional front view of the support device 40 along a plane represented by line '5-5' shown in FIG. 4B.

The support device 40, in an embodiment, is configured as a moveable bracket that includes a base 42 and a support member 44. The support member 44 is configured to be rotated or otherwise moved between a load position and a retracted position. The base 42 can be screwed or otherwise affixed to a fixed component or surface of the vehicle 10, such as the fixed floor 26. The base 42 is disposed proximate to a moveable load bearing component such as the load floor 22, such that the support member 44 can engage the component when in the load position.

In an embodiment, the support member 44 is attached to the base 42 and is rotatable between the retracted position in which the support member 44 does not support the floor 22 and is stowed below the floor 22, to the load position in which the support member 44 engages the load floor 22 when the load floor 22 is in the raised position. The support member 44 provides support to the load floor 22 and helps to distribute a load to avoid deforming or overly stressing the load floor 22.

The support member 44, in an embodiment, is attached to the base such that the support member 44 can be rotated between the positions. For example, one end of the support member 44 is attached to a pivot point, such as a pivot member 46 attached to the base 42 or integrally formed with the base 42. The support member 44 is mounted on the pivot member 46, for example, via a screw 48. A mechanical stop component, such as a rotation lock 50 of the support member 44, restricts rotation so that the support member 44 does not rotate past the load position. A biasing member such as a spring 52 biases the support member 44 toward the load position so that the support device 40 automatically moves to the load position when no load is applied thereto.

The support member 44 includes an engagement surface 54 that contacts or otherwise engages the load floor 22 when the load floor 22 is in the load position. The engagement surface 54 includes a curved front end 56 that is designed to allow the support member 44 to rotate as the floor 22 is raised and moved longitudinally.

Figure 6A:
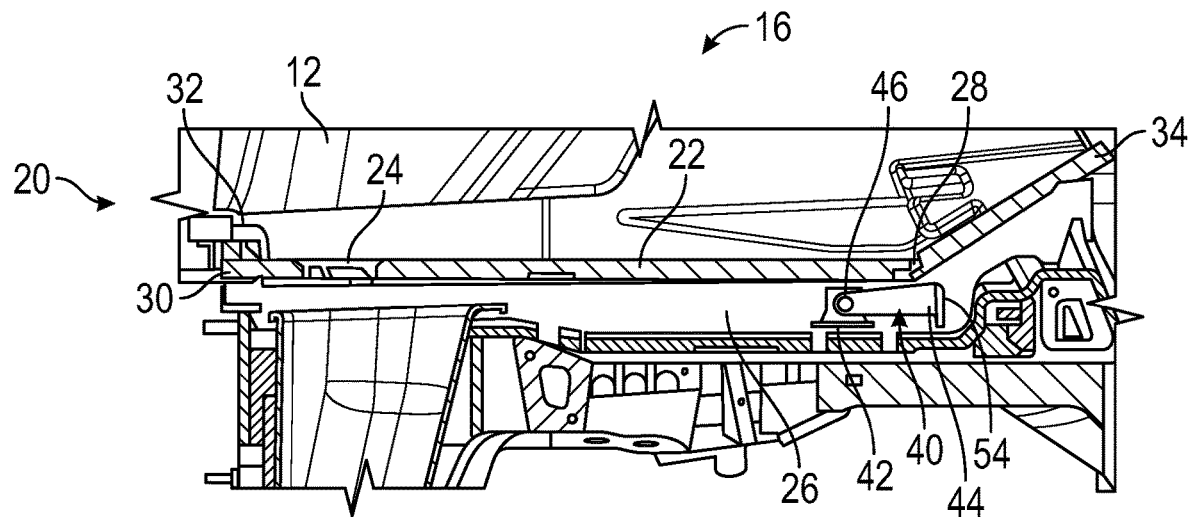
FIGS. 6A and 6B depict the support device of FIG. 3 in a load position and a retracted position relative to the moveable load floor of FIGS. 2A and 2B, in accordance with an exemplary embodiment.
Figure 6B:
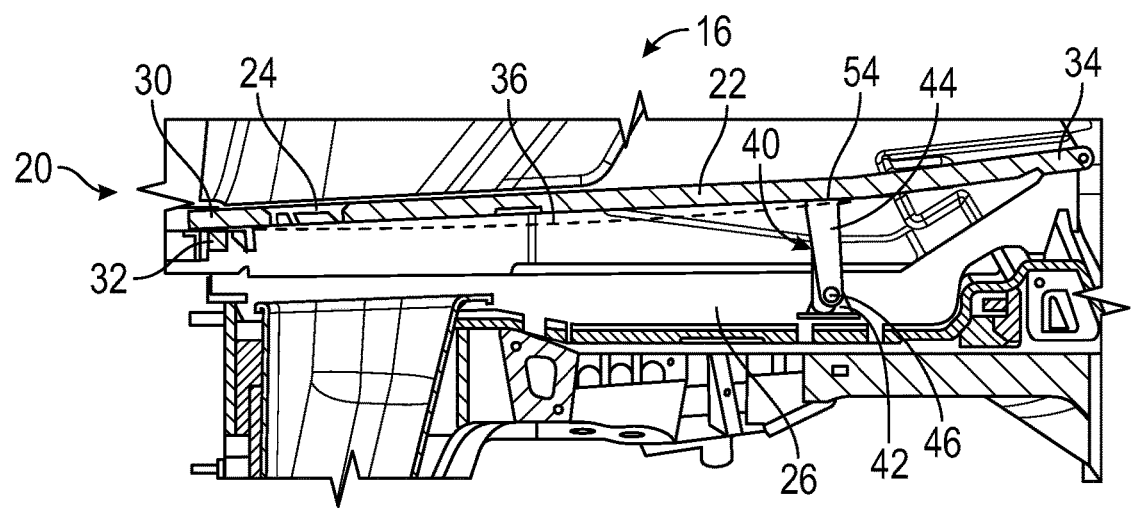

FIGS. 6A and 6B depict a cross-section of an example of the cargo compartment 16 having the support device 40 disposed therein. FIG. 6A shows the support device 40 in a retracted position. The support member 44 is held in the retracted position by the weight of the load floor 22 and is stowed below the load floor 22 when the load floor 22 is in the default position. The support device 40 in this example is hidden from view when looking into the cargo compartment 16, although the support device 40 need not be hidden.

FIG. 6B shows the support device 40 in the load position. As shown, the additional support provided by the support device prevents the load floor 22 from deforming or bending.

FIGS. 7-10 illustrate aspects of an embodiment of a method of converting a vehicle component such as a load floor 22, and operating the support device 40 to support the load floor 22. Aspects of the method may be performed by a processor or processors (e.g., to control an actuator to move the load floor) or by a user (e.g., by manually moving the load floor 22 to the raised position).

The method includes a number of steps or stages discussed in conjunction with FIGS. 7-10. The method is not limited to the number or order of steps therein, as some steps may be performed in a different order than that described below, or fewer than all of the steps may be performed. In addition, the method is not limited to use with the load floor 22 and can be used with any moveable support component.

Figure 7:
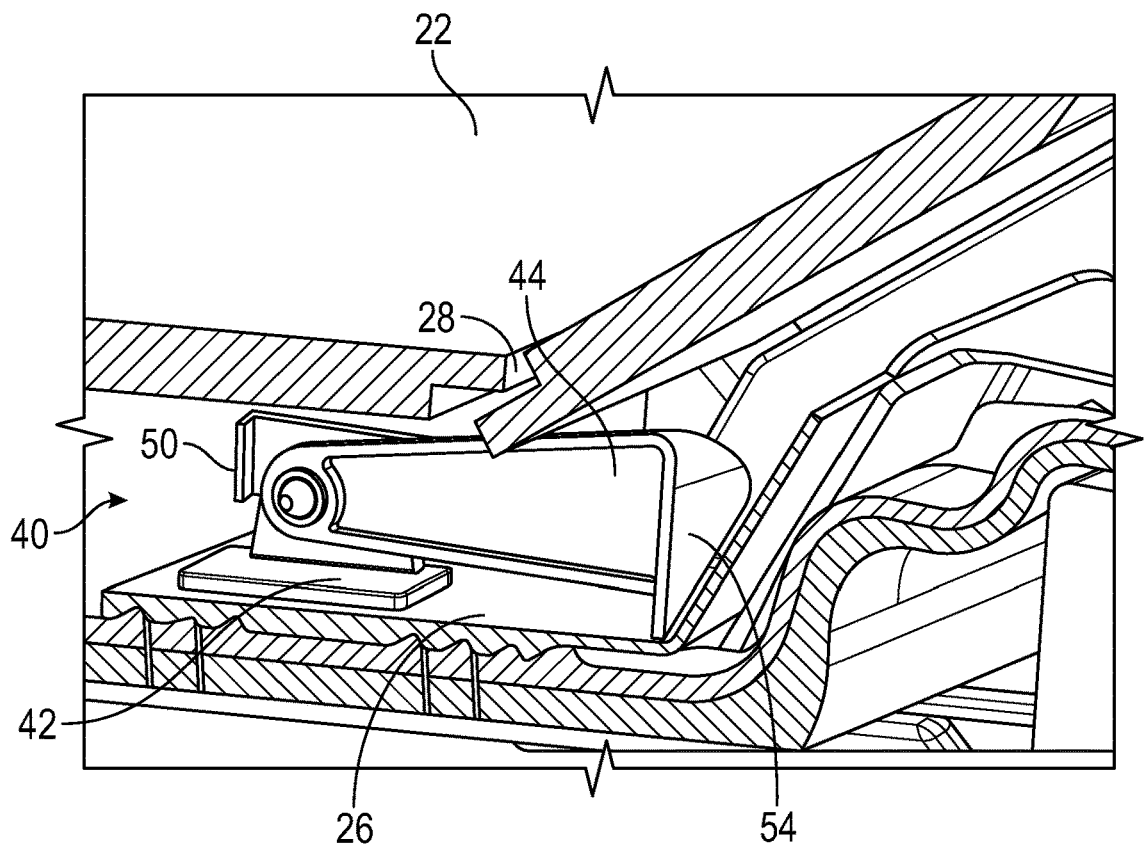
FIG. 7 depicts the support device of FIG. 6A in the retracted position.
Figure 8:
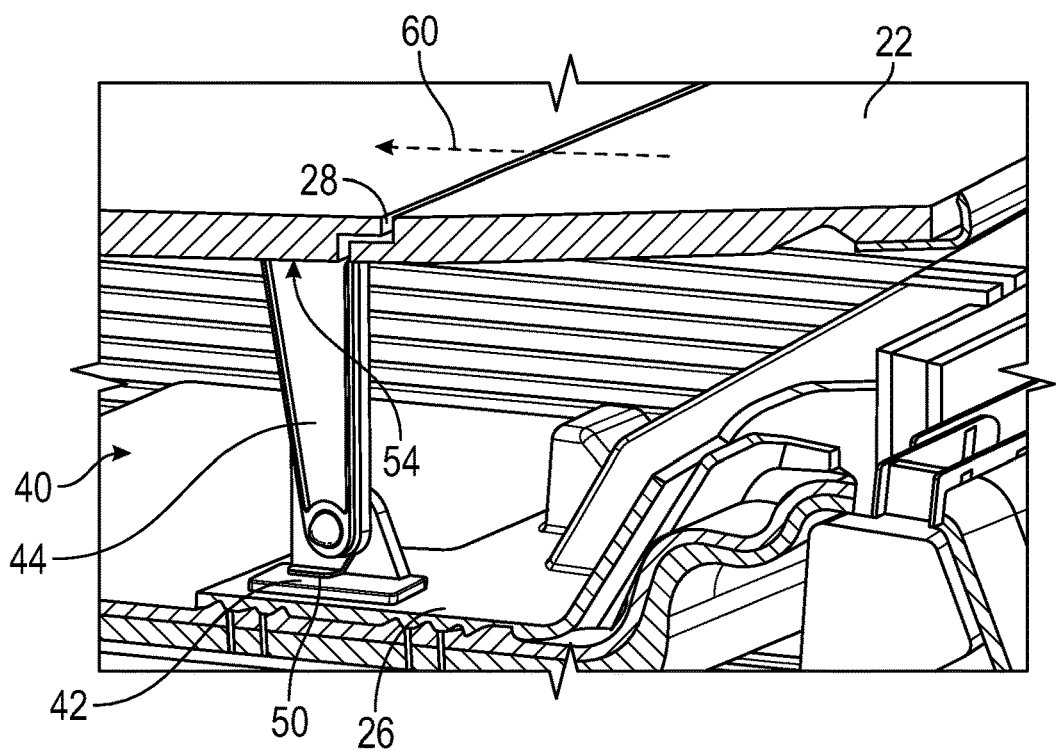
FIG. 8 depicts the support device of FIG. 6B in the load position.

In the method, a user or actuator moves the load floor 22 between a first position, such as a default position or lower position as shown in FIG. 7, to a second position, such as a raised position as shown in FIG. 8. The support member 44, based on movement of the load floor 22, automatically moves between the retracted position and the load position.

FIG. 7 shows the load floor 22 in the default or lower position. In this position, the weight of the load floor 22 overcomes the biasing force of the spring 52 (e.g., the spring 52 has a reaction force of about one Newton) and holds the support device 40 in the retracted position.

If the user (or actuator) causes the load floor 22 to be moved from the default position to the raised position, the support member 44 is caused by the spring 52 to automatically rotate to the load position. The support member 44 is oriented vertically in the load position and is prevented from further rotating by the stop element or rotation lock 50.

FIG. 8 shows the load floor 22 after the load floor 22 has been moved to the raised position. As shown, the support member 44 has rotated to the load position.

When desired, the floor 22 can be returned to the default position. As the floor 22 is moved to the default position, the floor 22 applies a force to the support member 44, causing the support member 44 to rotate back to the retracted position.

Figure 9:
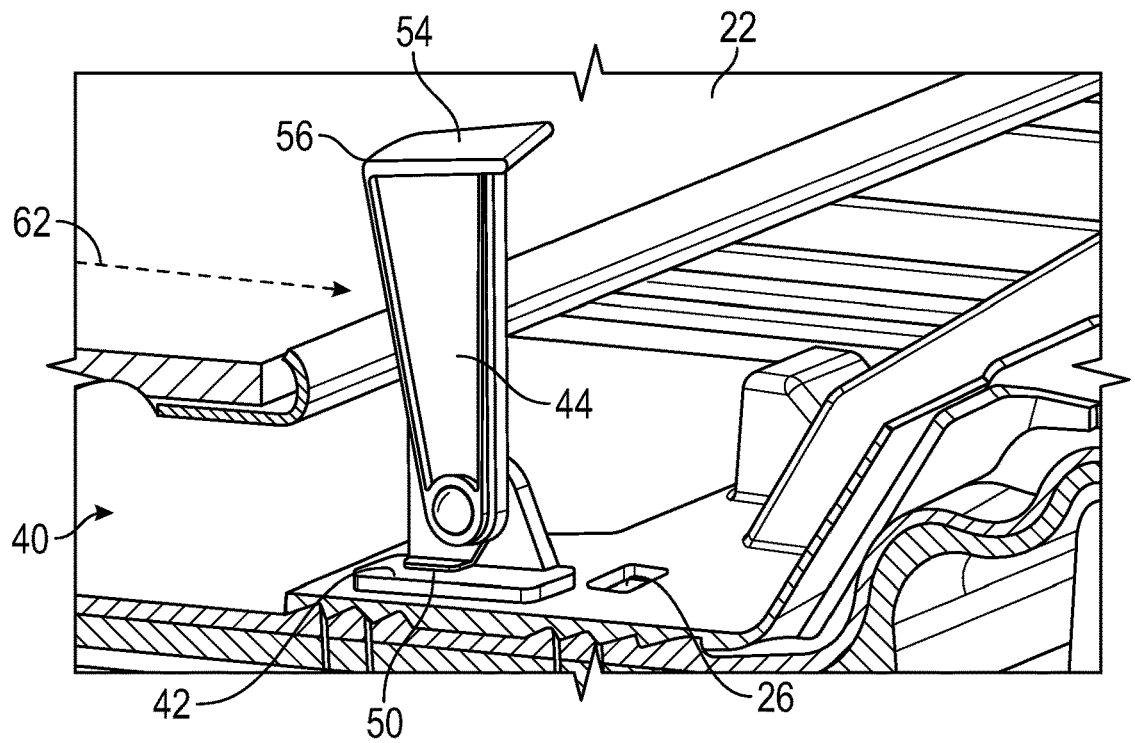
FIG. 9 depicts the support device of FIGS. 6A and 6B as the load floor is moved from a raised position to a lower position.

For example, to return the load floor to the default position, the user initially pulls the load floor 22 in a direction generally indicated by arrow 60 (FIG. 8). The load floor 22 is pulled past the support member 44 as shown in FIG. 9. The load floor 22 is then pushed longitudinally in the opposing direction (shown by arrow 62).

Figure 10:
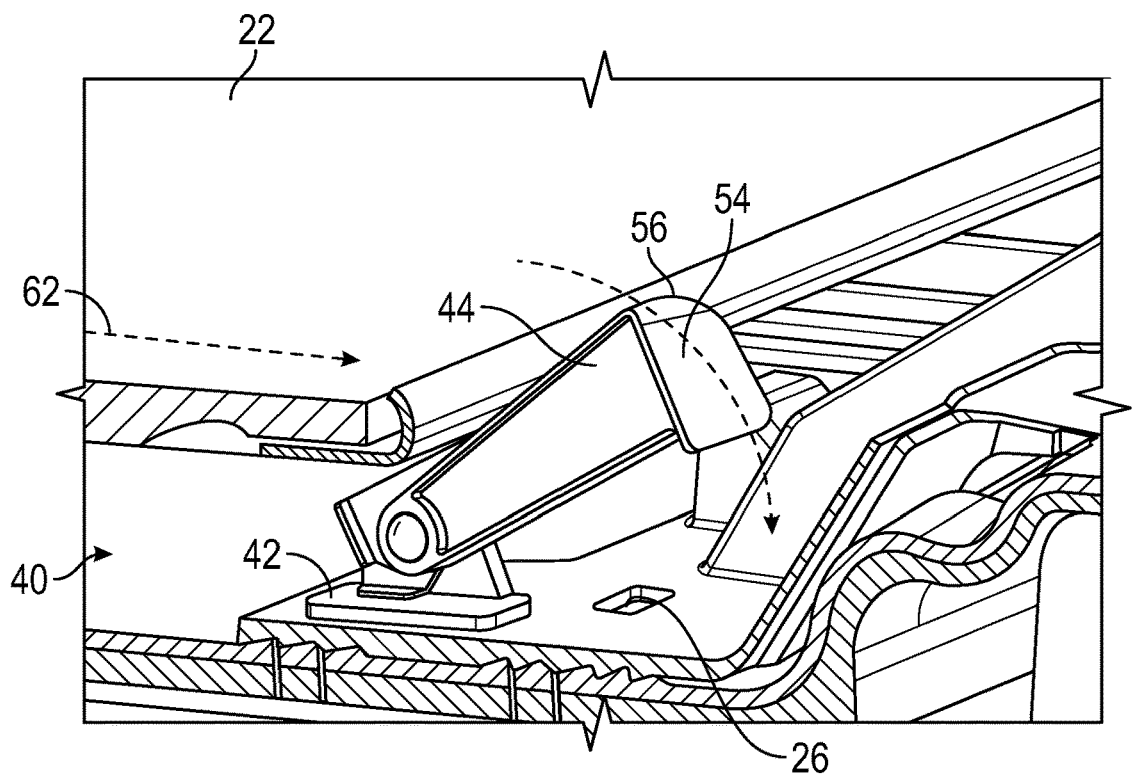
FIG. 10 depicts the support device of FIGS. 6A and 6B as the load floor is moved from the raised position to the lower position, and illustrates rotation of a support member of the support device.

As shown in FIG. 10, the load floor 22 exerts a force in the direction of arrow 62 as the load floor 22 is pushed, which causes the support member 44 to rotate towards the retracted position. The load floor 22 is continued to be pushed until the floor 22 is fully in the default position. At this point, the support member 44 is fully retracted and held under the load floor 22.

In the above embodiments, the support member 44 has two positions (i.e., the retracted and support position).

However, the support device 40 is not so limited and could have more than two positions.

FIGS. 11, 12A, 12B and 13 depict an embodiment of the support device 40 configured to be installed in the vehicle 10. FIG. 11 is a perspective view of the support device 40, and FIGS. 12A and 12B are opposing side views. FIG. 13 is a cross-sectional front view of the support device 40, taken along a plane represented by line '13-13' shown in FIG. 12B.

The support device 40 includes the base 42 and the support member 44. As discussed above, the support member 44 is configured to be rotated or otherwise moved between a load position and a retracted position.

In this embodiment, the base 42 includes an internal pivot member 46 on which the support member 44 is mounted. Rotation can be restricted via the rotation lock 50 or by the structure of the base 52. For example, the support member 44 includes a feature such as a protrusion 74 that forms a vertical surface that contacts a surface 76 of the base 42 to prevent the support structure from rotating beyond a vertical load position and ensure that the surface 54 has maximum contact with the load floor 22.

In this embodiment, the base 42 is made from opposing halves 70 and 72, which mate together to partially enclose a bottom portion of the support member 44. The halves 70 and 72 can be mated in any suitable manner, such as a snap fit connection or via an adhesive or screw.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A device for supporting a moveable load bearing component, comprising:
   a base configured to be fixedly disposed at a vehicle support structure and located proximate to the load bearing component, the load bearing component configured to be moved between a first position and a second position; and
   a support member having a first end connected to a pivot point attached to the base and rotatable between a retracted position and a load position, the support member supporting the load bearing component when the support member is in the load position, wherein the support member is configured to automatically rotate between the retracted position and the load position based on the load bearing component being moved between the first position and the second position, the support having a second end configured to engage the load bearing component when the support member is in the load position, the second end configured to be physically separate from the load bearing component when the support member is in the retracted position.

2. The device of claim 1, wherein the support member is configured to be rotated from the load position to the retracted position by a force applied by the load bearing component when the load bearing component is moved from the second position to the first position, and the support member is configured to be held in the retracted position by the load bearing component when the load bearing component is in the first position.

3. The device of claim 1, further comprising a biasing component configured to bias the support member toward the load position, the biasing component having a biasing force that is less than a weight of the load bearing component.

4. The device of claim 1, wherein the support member includes a curved front end that allows the support member to rotate as the load bearing component is moved.

5. The device of claim 4, wherein the load bearing component is a load floor in a vehicle compartment.

6. The device of claim 5, wherein the first position is a default position and the second position is a raised position relative to the first position, and the load floor is configured to be moved by longitudinally sliding the load floor.

7. The device of claim 6, wherein the support member is configured to be rotated from the load position to the retracted position by the load floor when the load floor is moved from the raised position to the default position, and held in the retracted position by a weight of the load floor when the load floor is in the default position.

8. The device of claim 7, wherein the support member is configured to rotate from the retracted position to the load position by a biasing component when the load floor is moved from the default position to the raised position.

9. A method of supporting a moveable load bearing component, comprising:
   moving the load bearing component in a vehicle compartment between a first position and a second position, the vehicle compartment including a support device having a base fixedly disposed at the vehicle compartment and located proximate to the load bearing component, the support device including a support member having a first end connected to a pivot point attached to the base and rotatable between a retracted position and a load position; and
   automatically rotating the support member between the retracted position and the load position based on the load bearing component being moved between the first position and the second position, the support member supporting the load bearing component when in the load position, the support member having a second end that engages the load bearing component when the support member is in the load position, the second end being physically separate from the load bearing component when the support member is in the retracted position.

10. The method of claim 9, wherein the support member is rotated from the load position to the retracted position by a force applied by the load bearing component when the load bearing component is moved from the second position to the first position, and the support member is held in the retracted position by the load bearing component when the load bearing component is in the first position.

11. The method of claim 9, wherein the support device includes a biasing component configured to bias the support member toward the load position, the biasing component having a biasing force that is less than a weight of the load bearing component.

12. The method of claim 9, wherein the support member includes a curved front end that allows the support member to rotate as the load bearing component is moved.

13. The method of claim 12, wherein the load bearing component is a load floor in a vehicle compartment.

14. The method of claim 13, wherein the first position is a default position and the second position is a raised position relative to the first position, and moving the load floor includes longitudinally sliding the load floor.

15. The method of claim 14, wherein the support member is moved from the load position to the retracted position by the load floor when the load floor is moved from the raised position to the default position, and held in the retracted position by a weight of the load floor when the load floor is in the default position.

16. The method of claim 15, wherein the support member is rotated from the retracted position to the load position by a biasing component when the load floor is moved from the default position to the raised position.

17. A vehicle system comprising:
a load bearing component disposed in a compartment of the vehicle, the load bearing component configured to be moved from a first position to a second position;
a support device including a base and a support member having a first end connected to a pivot point attached to the base, the base configured to be fixedly disposed in the compartment and located proximate to the load bearing component, the support member rotatable between a retracted position and a load position, the support member configured to support the load bearing component when the support member is in the load position, wherein the support member is configured to automatically rotate between the retracted position and the load position based on the load bearing component being moved between the first position and the second position, the support having a second end configured to engage the load bearing component when the support member is in the load position, the second end configured to be physically separate from the load bearing component when the support member is in the retracted position.

18. The vehicle system of claim 17, wherein the support member is configured to be rotated from the load position to the retracted position by a force applied by the load bearing component when the load bearing component is moved from the second position to the first position, and the support member is configured to be held in the retracted position by the load bearing component when the load bearing component is in the first position.

19. The vehicle system of claim 17, wherein the support device includes a biasing component configured to bias the support member toward the load position, the biasing component having a biasing force that is less than a weight of the load bearing component.

20. The vehicle system of claim 19, wherein the load bearing component is a load floor in a vehicle compartment, the first position is a default position and the second position is a raised position relative to the first position, the load floor configured to be moved by longitudinally sliding the load floor, wherein:
the support member is configured to be moved from the load position to the retracted position by the load floor when the load floor is moved from the raised position to the default position, and held in the retracted position by a weight of the load floor when the load floor is in the default position; and
the support member is configured to rotate from the retracted position to the load position by a biasing component when the load floor is moved from the default position to the raised position.

* * * * *